United States Patent
Jung et al.

(10) Patent No.: US 10,268,285 B2
(45) Date of Patent: Apr. 23, 2019

(54) STYLUS PEN, TOUCH SENSING SYSTEM AND DRIVING METHOD THEREOF

(71) Applicant: LG Display Co., Ltd., Seoul (KR)

(72) Inventors: Doyoung Jung, Seoul (KR); Hyunguk Jang, Paju-si (KR); Sungchul Kim, Goyang-si (KR); Sanghyuck Bae, Paju-si (KR); Sungsu Han, Goyang-si (KR); Suyun Ju, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 200 days.

(21) Appl. No.: 15/249,113

(22) Filed: Aug. 26, 2016

(65) Prior Publication Data

US 2017/0060278 A1    Mar. 2, 2017

(30) Foreign Application Priority Data

Aug. 31, 2015  (KR) .......... 10-2015-0123261
Dec. 15, 2015  (KR) .......... 10-2015-0179482

(51) Int. Cl.
G06F 3/0354    (2013.01)
G06F 3/041     (2006.01)
G06F 3/0487    (2013.01)
G06F 3/044     (2006.01)

(52) U.S. Cl.
CPC .......... G06F 3/03545 (2013.01); G06F 3/044 (2013.01); G06F 3/0412 (2013.01); G06F 3/0416 (2013.01)

(58) Field of Classification Search
CPC .. G06F 3/03545; G06F 3/0412; G06F 3/0416; G06F 3/044
See application file for complete search history.

(56) References Cited

U.S. PATENT DOCUMENTS

| | | | |
|---|---|---|---|
| 6,605,877 B1* | 8/2003 | Patterson | B60R 21/0155 307/10.1 |
| 8,971,568 B1* | 3/2015 | Smits | G06F 3/03545 382/100 |
| 2004/0201580 A1* | 10/2004 | Fujiwara | G06F 3/03545 345/179 |
| 2013/0106722 A1* | 5/2013 | Shahparnia | G06F 3/03545 345/173 |
| 2014/0160088 A1* | 6/2014 | Mercea | G06F 1/3259 345/179 |
| 2015/0070293 A1* | 3/2015 | Yu | G06F 3/044 345/174 |
| 2015/0193025 A1* | 7/2015 | Rebeschi | G06F 3/03545 345/174 |

* cited by examiner

Primary Examiner — Hong Zhou
(74) Attorney, Agent, or Firm — Fenwick & West LLP

(57) ABSTRACT

An active stylus pen generates a pen driving signal synchronized with a touchscreen driving signal received from a touchscreen and outputs the pen driving signal to the touchscreen. The active stylus pen includes a pressure sensing unit for sensing pressure when touching the touchscreen to generate writing pressure information and a signal processor for modulating the pen driving signal in response to the signal level of the writing pressure information and outputs the modulated signal as a pen driving signal in which the writing pressure information has been reflected.

9 Claims, 22 Drawing Sheets

(A)    (B)

(A)  (B)

STYLUS PEN, TOUCH SENSING SYSTEM AND DRIVING METHOD THEREOF

CROSS-REFERENCE TO RELATED APPLICATIONS

This application claims the benefit of Republic of Korea Patent Application No. 10-2015-0123261 filed on Aug. 31, 2015, and Republic of Korea Patent Application No. 10-2015-0179482 filed on Dec. 15, 2015, all of which are incorporated herein by reference for all purposes as if fully set forth herein.

BACKGROUND

Related Field

The present invention relates to a touch sensing system and, more specifically, to a touch sensing system for enabling touch input through an active stylus pen and a driving method thereof.

Discussion of the Related Art

A user interface (UI) is a device through which a person (user) can easily control electronic apparatuses. Typical examples of such user interface include a keypad, a keyboard, a mouse, an on-screen display (OSD), a remote controller having an infrared communication or radio frequency (RF) communication function and the like. User interface technology has developed to improve user sensitivity and operation convenience. Recently, user interfaces have evolved into a touch UI, a speech recognition UI, a 3D UI, etc.

The touch UI is essentially employed by portable information devices. The touch UI is implemented in such a manner that a touchscreen is configured on a screen of a display device. Such a touchscreen may be implemented as a capacitive type touchscreen. A touchscreen having a capacitive touch sensor senses touch input by sensing a capacitance variation according to input of a touchscreen driving signal, that is, a charge variation of the touch sensor when a user's finger or a conductive material touches (or approaches) the touch sensor.

The capacitive touch sensor may be implemented as a self-capacitance sensor or a mutual capacitance sensor. Electrodes of the self-capacitance sensor can be connected to respective sensor lines formed in one direction. The mutual capacitance sensor can be formed at intersections of sensor lines perpendicular to each other and having a dielectric layer interposed therebetween.

Recently, a stylus pen as well as a finger has been widely used to input commands in smartphones, e-readers and the like. The stylus pen has the advantage of more delicate input than a finger. The stylus pen may be classified into passive and active stylus pens. As to the passive stylus pen, less capacitance variation occurs at a contact point of the passive stylus pen and a touchscreen than an active stylus pen, and thus it may be difficult to detect a touch point. The active stylus pen self-generates a pen driving signal and outputs the generated pen driving signal to a contact point of the stylus pen and a touchscreen, and thus a touch point can be easily detected compared to the passive stylus pen.

When a stylus pen touches a touchscreen, a touch sensing system may execute various functions such as input signal processing in addition to touch input sensing. However, a conventional active stylus pen implements an additional communication block for transmitting writing pressure information to a touch module, as disclosed in Korean Patent No. 10-2014-0043299, thereby increasing manufacturing costs.

SUMMARY

Therefore, an object of the present invention is to provide an active stylus pen and a touch sensing system including the same for delivering writing pressure information from the active stylus pen to a touch module without an additional communication block, and a driving method thereof.

To accomplish the object, an active stylus pen includes: a pressure sensing unit for sensing pressure when touching a touchscreen to generate writing pressure information; and a signal processor for generating a pen driving signal synchronized with a touchscreen driving signal received from the touchscreen and varying the pen driving signal in response to a signal level of the writing pressure information.

The signal processor may modulate a pulse amplitude of the pen driving signal in response to the signal level of the writing pressure information.

The signal processor may modulate a number of pulses of the pen driving signal generated for one touch sensor driving period in response to the signal level of the writing pressure information.

The signal processor may modulate a pulse duty of the pen driving signal in response to the signal level of the writing pressure information.

The signal processor modulates the pen driving signal in each frame in response to the signal level of the writing pressure information, and a digital pen driving signal in which the writing pressure information has been reflected is allocated to each frame by one bit.

The signal processor may modulate a pulse amplitude, a number of pulses and a pulse duty of the pen driving signal within a range.

A touch sensing system according to the present invention includes: a touchscreen; a touch driver for applying a touchscreen driving signal to the touchscreen and sensing a capacitance variation in the touchscreen; and an active stylus pen for generating a pen driving signal and transmitting the pen driving signal to the touchscreen. Here, the active stylus pen includes: a pressure sensing unit for sensing pressure when touching the touchscreen to generate writing pressure information; and a signal processor for generating the pen driving signal synchronized with the touchscreen driving signal received from the touchscreen and varying the pen driving signal in response to a signal level of the writing pressure information.

A method of driving a touch sensing system according to the present invention includes: touching a touchscreen with an active stylus pen and receiving a touchscreen driving signal from the active stylus pen; generating a pen driving signal synchronized with the received touchscreen driving signal by the active stylus pen and outputting the pen driving signal to the touchscreen; and sensing a capacitance variation according to the touchscreen driving signal and the pen driving signal by a touch driver connected to the touchscreen. Here, the generating of the pen driving signal by the active stylus pen and outputting of the pen driving signal to the touchscreen includes: sensing pressure when touching the touchscreen to generate writing pressure information; and varying the pen driving signal in response to a signal level of the writing pressure information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may obscure the subject matter of the present invention.

[Touch Sensing System]

Figure 1:
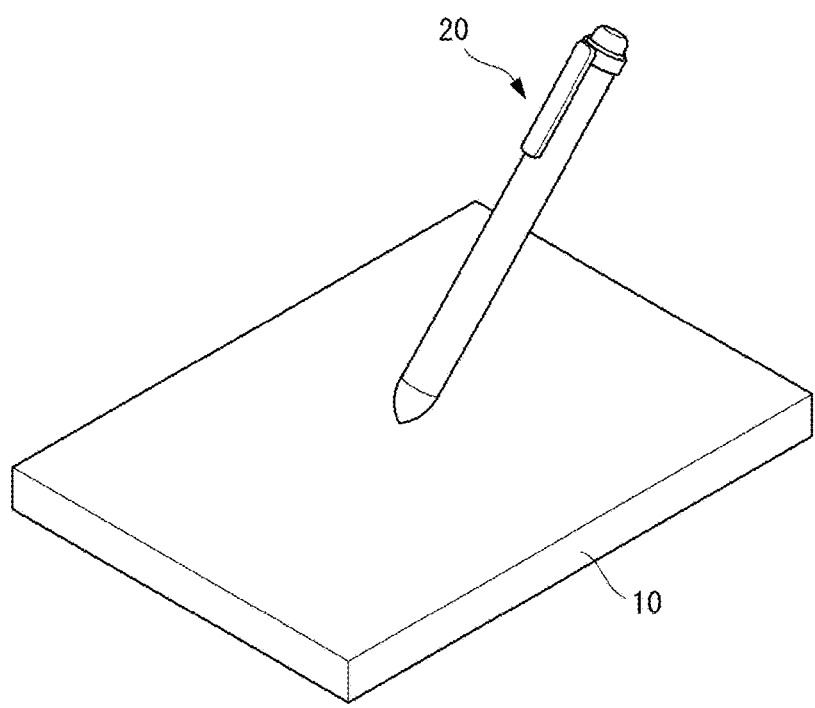
FIG. 1 illustrates a touch sensing system of the present invention.

FIG. 1 illustrates a touch sensing system of the present invention.

Referring to FIG. 1, the touch sensing system of the present invention includes a display apparatus 10 and an active stylus pen 20.

The display apparatus 10 executes a display function and a touch sensing function. The display apparatus 10 can sense touch according to contact of a conductive object such as a finger or the active stylus pen 20. The display apparatus 10 includes a capacitive touchscreen integrated therewith. Here, the touchscreen may be configured independently of a display panel or may be embedded in a pixel array of the display panel. The detailed configuration and operation of the display apparatus 10 will be described below with reference to FIGS. 2 to 8.

The active stylus pen 20 generates a pen driving signal on the basis of a touchscreen driving signal received from the touchscreen and outputs the pen driving signal to a contact point on the touchscreen to facilitate sensing of a touch point on the touchscreen. The active stylus pen 20 senses pen pressure (writing pressure) when the active stylus pen 20 touches the touchscreen and varies the pen driving signal such that a signal level of writing pressure information is reflected in the pen driving signal. The touch sensing system senses the touch point and the touch pressure (writing pressure) of the active stylus pen 20 by analyzing a touch raw data variation according to the pen driving signal. The configuration and operation of the active stylus pen 20 will be described below with reference to FIGS. 9 to 26.

[Display Apparatus]

Figure 2:
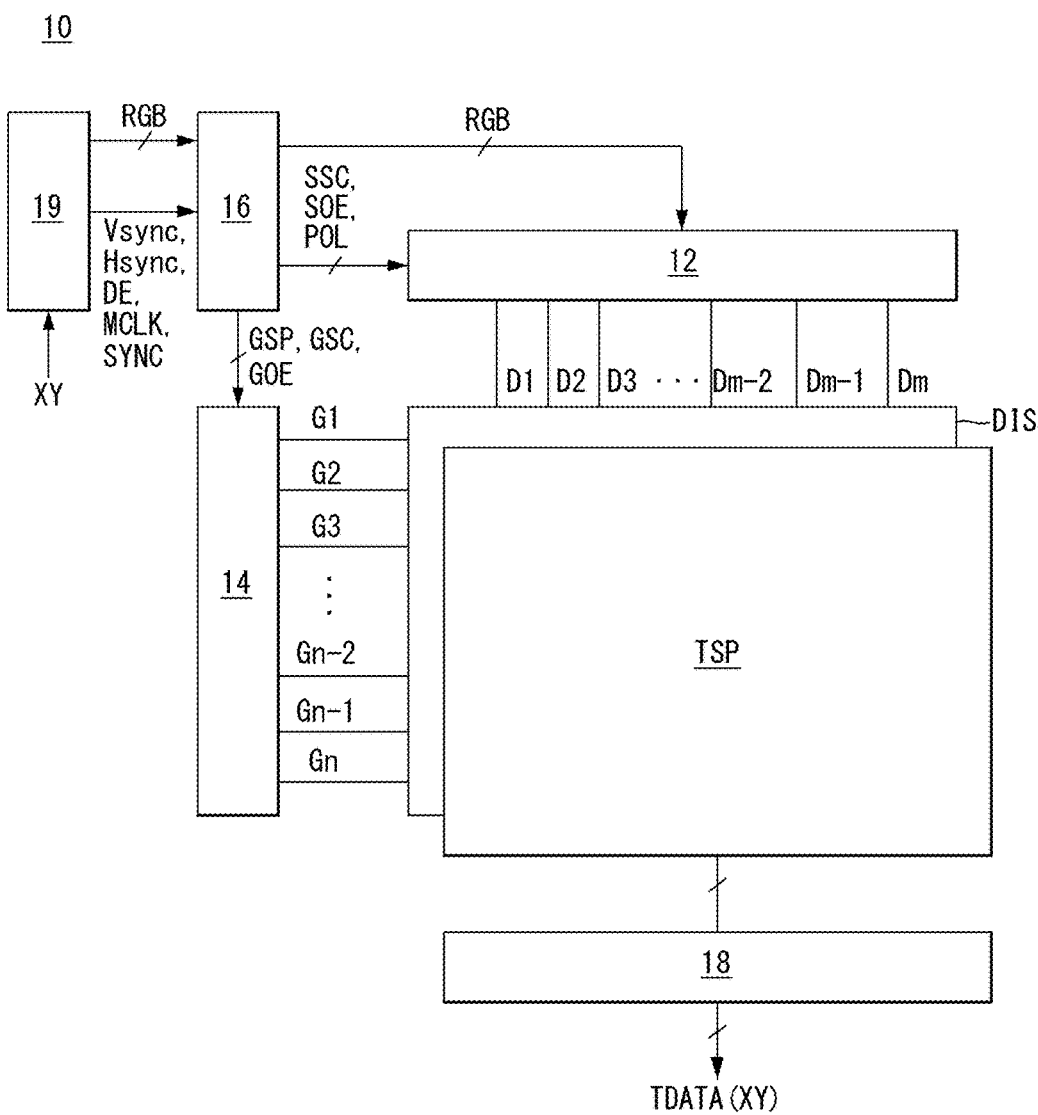
FIG. 2 illustrates a display apparatus to which the touch sensing system according to an embodiment of the present invention is applied.
Figure 3:
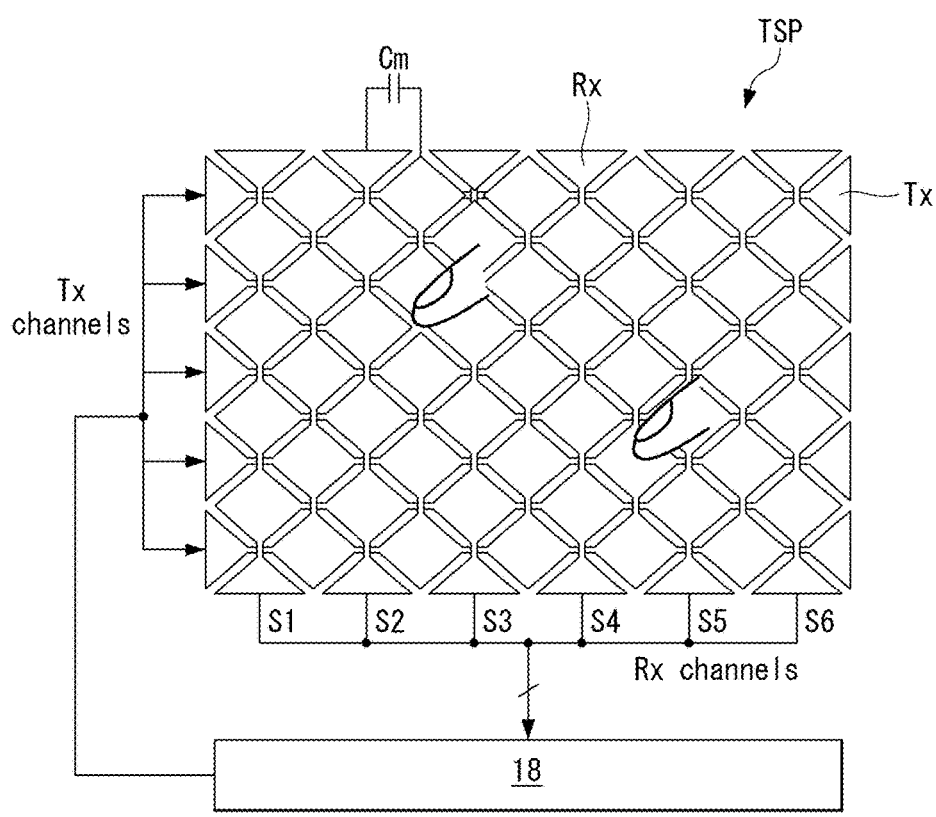
FIG. 3 illustrates an example of a touchscreen configured using mutual capacitance sensors.
Figure 4:
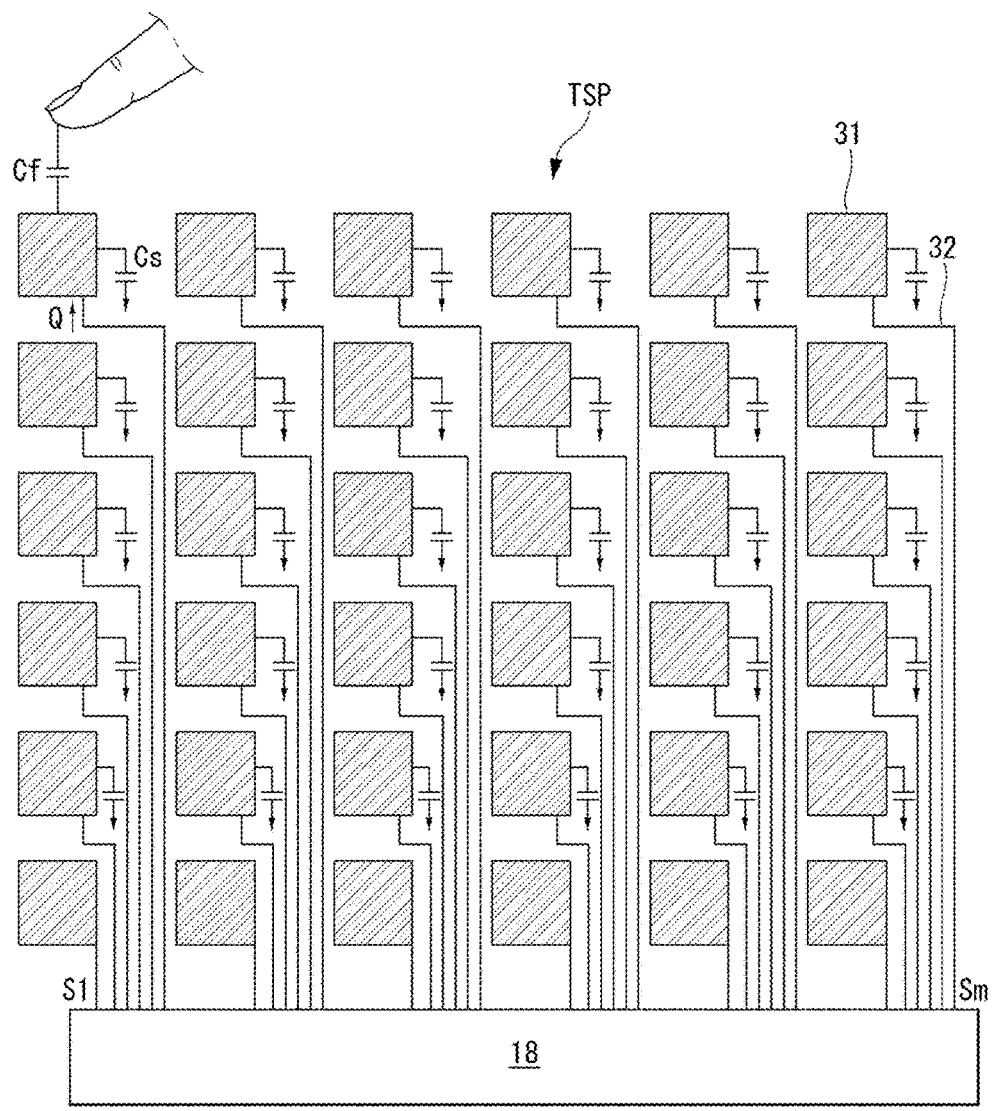
FIG. 4 illustrates an example of a touchscreen configured using self-capacitance sensors.
Figure 5:
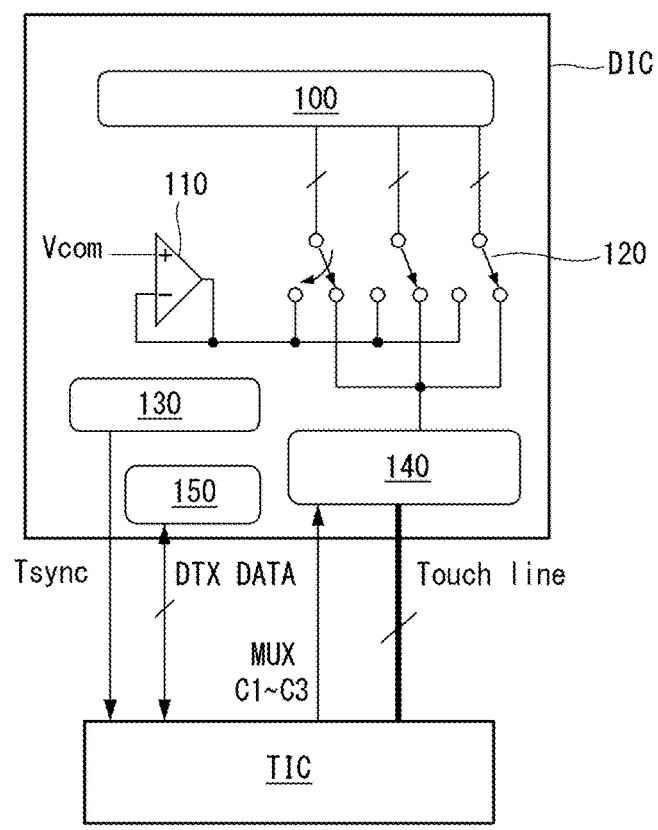
FIGS. 5, 6 and 7 illustrate touch drivers according to embodiments of the present invention.
Figure 6:
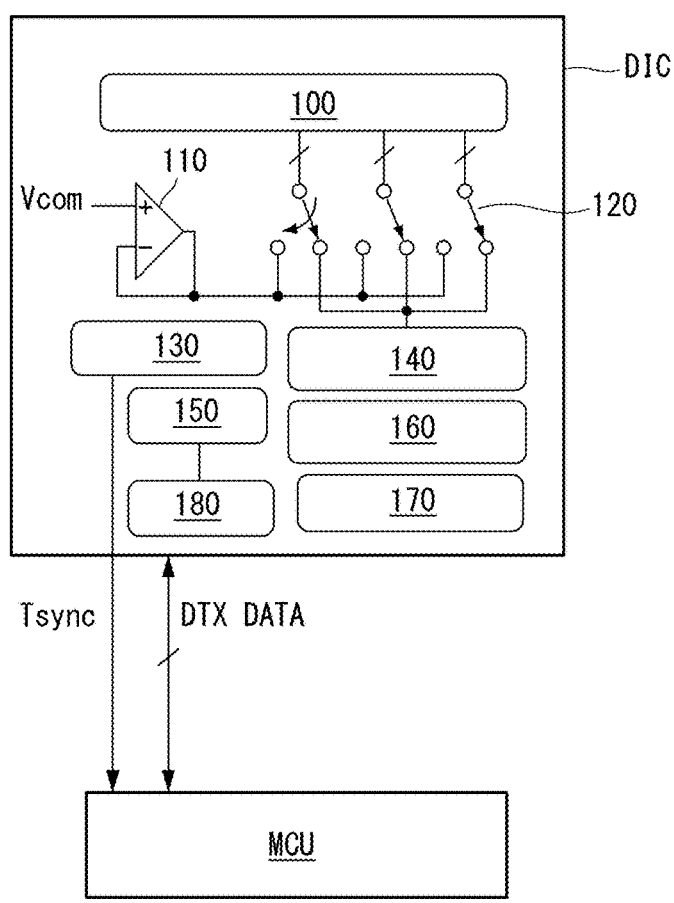
Figure 7:
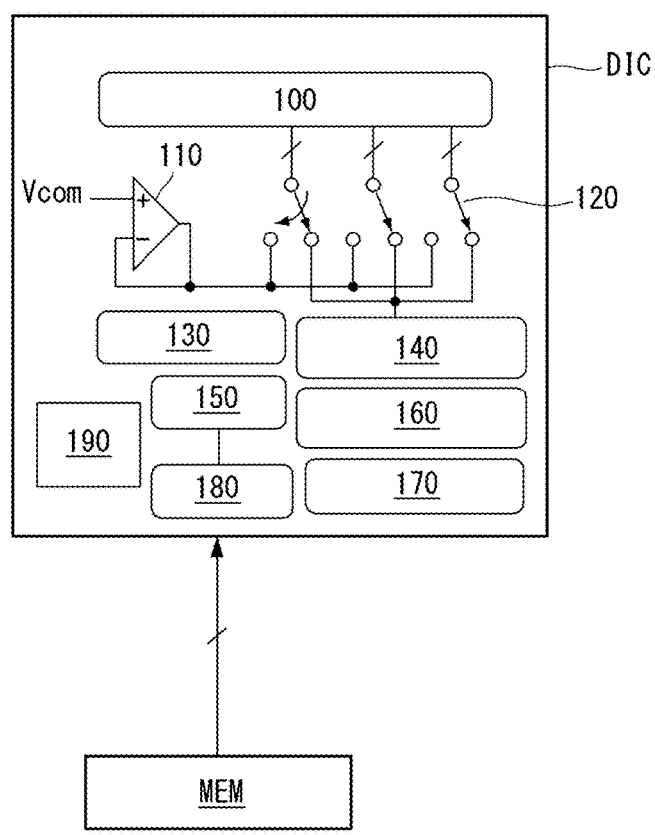

FIG. 2 illustrates the display apparatus to which the touch sensing system according to an embodiment of the present invention is applied and FIG. 3 illustrates an example of a touchscreen configured using mutual capacitance sensors. FIG. 4 illustrates an example of a touchscreen configured using self-capacitance sensors, and FIGS. 5, 6 and 7 illustrate touch drivers according to embodiments of the present invention.

Referring to FIGS. 2 to 7, the display apparatus 10 of the present invention may be implemented based on a flat panel display such as a liquid crystal display (LCD), a field emission display (FED), a plasma display panel (PDP), an organic light emitting display (OLED) or an electrophoretic display (EPD). While the display apparatus is configured as an LCD in the following embodiments, the display apparatus of the present invention is not limited to the LCD.

The display apparatus 10 includes a display module and a touch module.

The touch module includes a touchscreen TSP and a touch driver 18.

The touchscreen TSP may be implemented as a capacitive touchscreen that senses touch input through a plurality of capacitance sensors. The touchscreen TSP includes a plurality of touch sensors having capacitance. Capacitance can be classified into self-capacitance and mutual capacitance. Self-capacitance may be generated along single-layer conductive lines formed in one direction and mutual capacitance may be generated between two perpendicular conductive lines.

The touchscreen TSP implemented using mutual capacitance sensors Cm may include Tx electrode lines, Rx electrode lines intersecting the Tx electrode lines, and touch sensors Cm formed at intersections of the Tx electrode lines and the Rx electrode lines, as illustrated in FIG. 3. The Tx electrode lines are driving signal lines through which a touchscreen driving signal is applied to the touch sensors Cm to provide charges to the touch sensors. The Rx electrode lines are sensor lines connected to the touch sensors Cm, through which charges of the touch sensors are supplied to the touch driver 18. A mutual capacitance sensing method may apply a driving signal to a Tx electrode through a corresponding Tx electrode line to provide charges to a corresponding touch sensor Cm and sense a capacitance variation of the touch sensor Cm through a corresponding Rx electrode and Rx electrode line in synchronization with a touchscreen driving signal, thereby detecting touch input.

In the touchscreen TSP implemented using self-capacitance sensors Cs, touch electrodes 31 may be connected to respective sensor lines 32 formed in one direction, as illustrated in FIG. 4. Each self-capacitance sensor Cs has capacitance formed in each electrode 31. In a self-capacitance sensing method, when a touchscreen driving signal is applied to an electrode 31 through a sensor line 32, charges Q are accumulated in a corresponding touch sensor Cs. Here, when a finger or a conductive object contacts the electrode 31, parasitic capacitance Cf is additionally applied to the self-capacitance sensor Cs to change a total capacitance value. When a capacitance value of a sensor touched by a finger becomes different from a capacitance value of a sensor that is not touched, charge amounts sensed from the touch sensors vary, and thus touch may be determined through the variation.

The touchscreen TSP may be attached to an upper polarizer of a display panel DIS or formed between the upper polarizer and an upper substrate of the display panel DIS. The touch sensors Cm or Cs of the touchscreen TSP may be embedded in a pixel array of the display panel DIS.

The touch driver 18 senses charge variations of touch sensors before and after touch to determine touch by a conductive object such as a finger (or a stylus pen) and a touch point corresponding to the touch.

The touch driver 18 of the present invention may be implemented as integrated circuit (IC) packages as illustrated in FIGS. 5, 6 and 7.

Referring to FIG. 5, the touch driver 18 includes a driver IC DIC and a touch IC TIC.

The driver IC DIC includes a touch sensor channel part 100, a Vcom buffer 110, a switch array 120, a timing control signal generator 130, a multiplexer (MUX) 140 and a DTX compensator 150.

The touch sensor channel part 100 is connected to electrodes of touch sensors through sensor lines (or Rx electrode lines) and connected to the Vcom buffer 110 and the multiplexer 140 through the switch array 120. The multiplexer 140 connects the sensor lines to the touch IC TIC. When the multiplexer 140 is a 1:3 multiplexer, the multiplexer 140 reduces the number of channels of the touch IC TIC by sequentially connecting one channel of the touch IC TIC to three sensor lines according to time division. The multiplexer 140 sequentially selects sensor lines connected to channels of the touch IC TIC in response to MUX control signals MUX C1 to C3. The multiplexer 140 is connected to the channels of the touch IC TIC through touch lines.

The Vcom buffer 110 outputs a common voltage Vcom of pixels. The switch array 120 supplies the common voltage Vcom from the Vcom buffer 110 to the touch sensor channel part 100 for a display driving period under the control of the timing control signal generator 130. The switch array 120 connects the sensor lines to the touch IC TIC for a touch sensor driving period under the control of the timing control signal generator 130.

The timing control signal generator 130 generates timing control signals for controlling operation timing of a display driving circuit and the touch IC TIC. The display driving circuit includes a data driving circuit 12 and a gate driving circuit 14.

The timing control signal generator 130 may be included in a timing controller 16 illustrated in FIG. 2. The timing control signal generator 130 drives the display driving circuit for a display driving period and drives the touch IC TIC for a touch sensor driving period.

Figure 8:
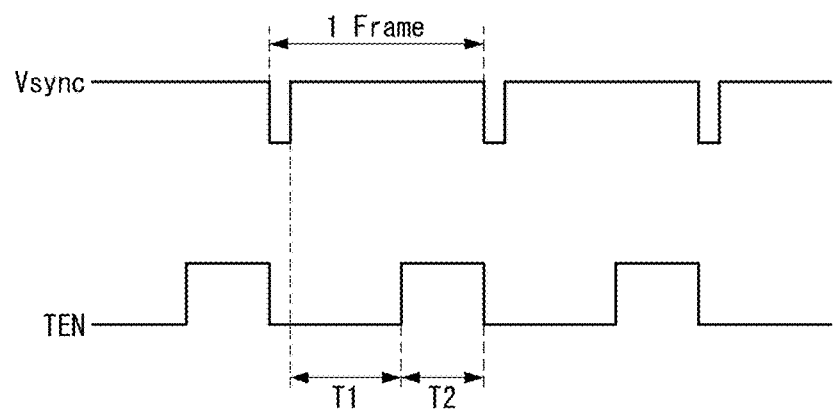
FIG. 8 illustrates time division of one frame into a display driving period and a touch sensor driving period.

The timing control signal generator 130 generates a touch enable signal TEN that defines a display driving period T1 and a touch sensor driving period T2, as illustrated in FIG. 8, and synchronizes the display driving circuit with the touch IC TIC. The display driving circuit writes data into pixels for a first level period of the touch enable signal TEN. The touch IC TIC drives touch sensors in response to a second level of the touch enable signal TEN to sense touch input. The first level of the touch enable signal TEN may be a low level and the second level may be a high level, or vice versa.

The touch IC TIC is connected to a driving power supply (not shown) to be provided with driving power. The touch IC TIC generates a touchscreen driving signal in response to the second level of the touch enable signal TEN and applies the touchscreen driving signal to the touch sensors of the touchscreen TSP. While the touchscreen driving signal may have various forms, such as a square wave, a sine wave and a triangular wave, it is desirable that the touchscreen driving signal be a square-wave signal. The touchscreen driving signal may be applied to each touch sensor N times such that charges are accumulated N times or more in an integrator of the touch IC TIC (N being a natural number of 2 or larger).

Noise in a touch sensor signal may increase according to input video data variation. The DTX compensator 150 analyzes input video data, removes a noise component from touch raw data in response to grayscale variation of an input image and transmits the noise component removed touch raw data to the touch IC TIC. DTX refers to display and touch crosstalk. The contents related to the DTX compensator 150 are described in detail in Republic of Korea Patent Application No. 10-2012-0149028 (19 Dec. 2012). In the case of a system in which touch sensor noise does not sensitively change with input video data variation, the DTX compensator 150 may be omitted. In FIG. 5, DTX DATA denotes output data of the DTX compensator 150.

The touch IC TIC drives the multiplexer 140 for the touch sensor driving period T2 in response to the touch enable signal TEN from the timing control signal generator 130 to receive charges of the touch sensors through the multiplexer 140 and the sensor lines. In FIG. 5, MUX C1 to C3 denote signals for selecting channels of the multiplexer.

The touch IC TIC detects charge variations before and after touch input from touch sensor signals, compares the charge variations with a predetermined threshold value and determines positions of touch sensors having charge variations exceeding the threshold value as a touch input region. The touch IC TIC calculates coordinates of each touch input and transmits touch data TDATA(XY) including touch input coordinate information to an external host system. The touch IC TIC includes an amplifier for amplifying charges of touch sensors, an integrator for integrating charges received from the touch sensors, an analog-to-digital converter (ADC) for converting a voltage of the integrator into digital data, and an operation logic unit. The operation logic unit executes a touch recognition algorithm that compares touch raw data output from the ADC with a threshold value, determines a touch input according to a comparison result and calculates coordinates of the touch input.

The driver IC DIC and the touch IC TIC may transmit and receive signals through a serial peripheral interface (SPI).

A host system 19 refers to an electronic apparatus system to which the display apparatus 10 of the present invention is applicable. The host system 19 may be one of a phone system, a TV system, a set-top box, a navigation system, a DVD player, a Blu-ray player, a personal computer (PC) and a home theater system. The host system 19 transmits input video data RGB to the driver IC DIC, receives the touch input data TDATA(XY) from the touch IC TIC and executes an application associated with touch input.

Referring to FIG. 6, the touch driver 18 includes a driver IC DIC and a microcontroller unit (MCU).

The driver IC DIC includes a touch sensor channel part 100, a Vcom buffer 110, a switch array 120, a first timing control signal generator 130, a multiplexer 140, a DTX compensator 150, a sensing unit 160, a second timing control signal generator 170 and a memory 180. The embodiment shown in FIG. 6 differs from the embodiment illustrated in FIG. 5 in that the sensing unit 160 and the second timing control signal generator 170 are integrated in the driver IC DIC. The first timing control signal generator 130 is substantially the same as the timing control signal generator of FIG. 5. Accordingly, the first timing control signal generator 130 generates timing control signals for controlling operation timing of the display driving circuit and the touch IC TIC.

The sensing unit 160 includes an amplifier for amplifying charges of touch sensors, an integrator for integrating charges received from the touch sensors, and an ADC for converting a voltage of the integrator into digital data. Touch raw data TDATA output from the ADC is transmitted to the MCU. The second timing control signal generator 170 generates timing control signals and a clock signal for controlling operation timing of the multiplexer 140 and the sensing unit 160. The DTX compensator 150 in the driver IC DIC may be omitted. The memory 180 temporarily stores the touch raw data TDATA under the control of the second timing control signal generator 170.

The driver IC DIC and the MCU may transmit and receive signals through a serial peripheral interface (SPI). The MCU executes a touch recognition algorithm that compares touch raw data TDATA with a threshold value, determines a touch input depending on a comparison result, and calculates coordinates of the touch input.

Referring to FIG. 7, the touch driver 18 includes a driver IC DIC and a memory MEM.

The driver IC DIC includes a touch sensor channel part 100, a Vcom buffer 110, a switch array 120, a first timing control signal generator 130, a multiplexer 140, a DTX compensator 150, a sensing unit 160, a second timing control signal generator 170, a memory 180 and an MCU 190. The embodiment shown in FIG. 7 differs from the embodiment illustrated in FIG. 6 in that the MCU 190 is integrated in the driver IC DIC. The MCU 190 executes a touch recognition algorithm that compares touch raw data TDATA with a threshold value, determines touch input depending on a comparison result and calculates coordinates of the touch input.

The memory MEM stores register setting values with respect to timing information for operations of the display driving circuit and the sensing unit 160. The register setting values are loaded from the memory MEM to the first timing control signal generator 130 and the second timing control signal generator 170 when the display apparatus is turned on. The first timing control signal generator 130 and the second timing control signal generator 170 generate timing control signals for controlling the display driving circuit and the sensing unit 160 on the basis of the register setting values read from the memory. It is possible to cope with model change by changing the register setting values stored in the memory MEM without structural change of a driving apparatus.

The display module may include a display panel DIS, display driving circuits 12, 14 and 16, and the host system 19.

The display panel DIS includes a liquid crystal layer formed between two substrates. A pixel array of the display panel DIS includes pixels formed in pixel regions defined by data lines D1 to Dm (m being a positive integer) and gate lines G1 to Gn (n being a positive integer). The pixels may respectively include thin film transistors (TFTs) formed at intersections of the data lines D1 to Dm and the gate lines G1 to Gn, pixel electrodes charging data voltages, and storage capacitors Cst connected to the pixel electrodes to maintain voltages of liquid crystal cells.

An upper substrate of the display panel DIS may include a black matrix and a color filter formed thereon. A lower substrate of the display panel DIS may have a COT (color filter on TFT) structure. In this case, the black matrix and the color filter may be formed on the lower substrate of the display panel DIS. A common electrode to which the common voltage is supplied may be formed on the upper substrate or the lower substrate of the display panel DIS. Polarizers are respectively attached to the upper substrate and the lower substrate of the display panel DIS and alignment films for setting a pretilt angle of liquid crystal are formed on the inner sides of the upper substrate and the lower substrate, which come into contact with liquid crystal. Column spacers for maintaining a cell gap of the liquid crystal cells are formed between the upper substrate and the lower substrate of the display panel DIS.

A backlight unit may be provided behind the display panel DIS. The backlight unit is implemented as an edge type or direct type backlight unit and emits light to the display panel DIS. The display panel DIS may be implemented in any known mode such as a TN (Twisted Nematic) mode, a VA (Vertical Alignment) mode, an IPS (In Plane Switching) mode or an FFS (Fringe Field Switching) mode.

The display driving circuit includes the data driving circuit 12, the gate driving circuit 14 and a timing controller 16, and writes input video data to the pixels of the display panel DIS. The data driving circuit 12 converts digital video data RGB input from the timing controller 16 into analog positive/negative gamma compensation voltages and outputs data voltages. The data voltages output from the data driving circuit 12 are supplied to the data lines D1 to Dm. The gate driving circuit 14 sequentially supplies gate pulses (or scan pulses) synchronized with the data voltages to the gate lines G1 to Gn to select pixel lines of the display panel DIS, to which the data voltages are written. The gate driving circuit 14 may be arranged on the substrate of the display panel DIS along with the pixels.

The timing controller 16 receives timing signals such as a vertical synchronization signal Vsync, a horizontal synchronization signal Hsync, a data enable signal DE and a main clock signal MCLK from the host system 19 and synchronizes operation timing of the data driving circuit 12 with operation timing of the gate driving circuit 14. A scan timing control signal includes a gate start pulse (GSP) signal, a gate shift clock signal and a gate output enable signal GOE. A data timing control signal includes a source sampling clock (SSC) signal, a polarity control signal POL and a source output enable signal (SOE).

The host system 19 may transmit the timing signals Vsync, Hsync, DE and MCLK together with digital video data RGB to the timing controller 16 and execute an application program associated with touch coordinate information XY input from the touch driver 18.

The touch enable signal TEN illustrated in FIG. 8 may be generated in the host system 19. The data driving circuit 12 supplies data voltages to the data lines D1 to Dm for the display driving period T1 under the control of the timing controller 16 and the gate driving circuit 14 sequentially supplies gate pulses synchronized with the data voltages to the gate lines G1 to Gn under the control of the timing controller 16. The touch driver 18 does not operate for the display driving period T1.

The touch driver 18 applies a touchscreen driving signal to the touch sensors of the touchscreen TSP for the touch sensor driving period T2. For the touch sensor driving period T2, the display driving circuits 12, 14 and 16 may provide an AC signal having the same amplitude and the same phase as the touchscreen driving signal to the signal lines D1 to Dm and G1 to Gn in order to minimize parasitic capacitance between the signal lines D1 to Dm and G1 to Gn connected to the pixels and the touch sensors. In this case, display noise in a touch sensing signal is remarkably reduced, improving touch sensing accuracy.

[Stylus Pen]

Figure 9:
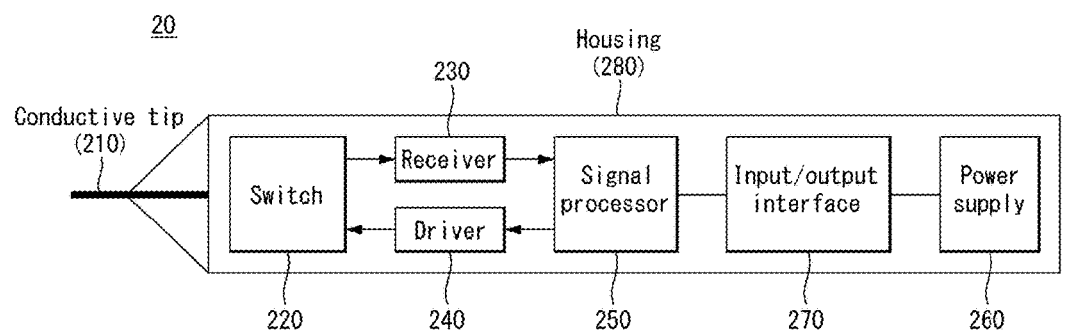
FIG. 9 illustrates a configuration of an active stylus pen according to the present invention.

FIG. 9 illustrates a configuration of the active stylus pen 20 according to the present invention.

Referring to FIG. 9, the active stylus pen 20 includes a housing 280, a conductive tip 210 projected from one side of the housing 280, a switch 220 connected with the conductive tip 210 in the housing 280, a receiver 230 for receiving a touchscreen driving signal input from the conductive tip 210, a signal processor 250 for generating a digital pen driving signal including writing pressure information and synchronized with the touchscreen driving signal from the receiver 230, on the basis of the touchscreen driving signal, a driver 240 for shifting the digital pen driving signal generated by the signal processor 250 to obtain an analog signal and then supplying the analog signal to the conductive tip 210 through the switch 220, a power supply 260 for generating driving power to operate the active stylus pen 20, and an input/output interface 270.

The conductive tip 210 is formed of a conductive material such as metal and serves as a reception electrode and a transmission electrode. When the conductive tip 210 contacts the touchscreen TSP of the display apparatus 10, the conductive tip 210 is coupled to the touchscreen TSP at the contact point. The conductive tip 210 receives a touchscreen driving signal from the touchscreen TSP at the contact point and then transmits a pen driving signal, which is generated in the stylus pen 20 and synchronized with the touchscreen driving signal, to the contact point of the touchscreen TSP.

The switch 220 electrically connects the conductive tip 210 to the receiver 230 for a first time period and then electrically connects the conductive tip 210 to the driver 240 for a second time period when the conductive tip 210 contacts the touchscreen TSP of the display apparatus 10, thereby temporally separating touchscreen driving signal reception timing from pen driving signal transmission timing. Since the conductive tip 210 serves as both the reception electrode and the transmission electrode, the structure of the active stylus pen 20 is simplified.

The receiver 230 includes at least one amplifier and may amplify the touchscreen driving signal input from the conductive tip 210 through the switch 220. The receiver 230 includes a comparator, compares the amplified signal with a predetermined reference voltage and outputs a comparison result to the signal processor 250.

The signal processor 250 analyzes one frame or more of the comparator output signal input from the receiver 230 to generate a pen driving signal synchronized with the touchscreen driving signal, modulates the pen driving signal on the basis of writing pressure information input from a pressure sensing unit (not shown) connected to the conductive tip 210 and outputs the modulated pen driving signal to the driver 240.

The driver 240 includes a level shifter and shifts the pen driving signal at a digital level to an analog level. The driver 240 outputs the level-shifted pen driving signal to the conductive tip 210 through the switch 220.

The input/output interface 270 may be connected to the power supply 260 according to a button push operation of a user to supply power for the receiver 230, the driver 240 and the signal processor 250.

Figure 10:
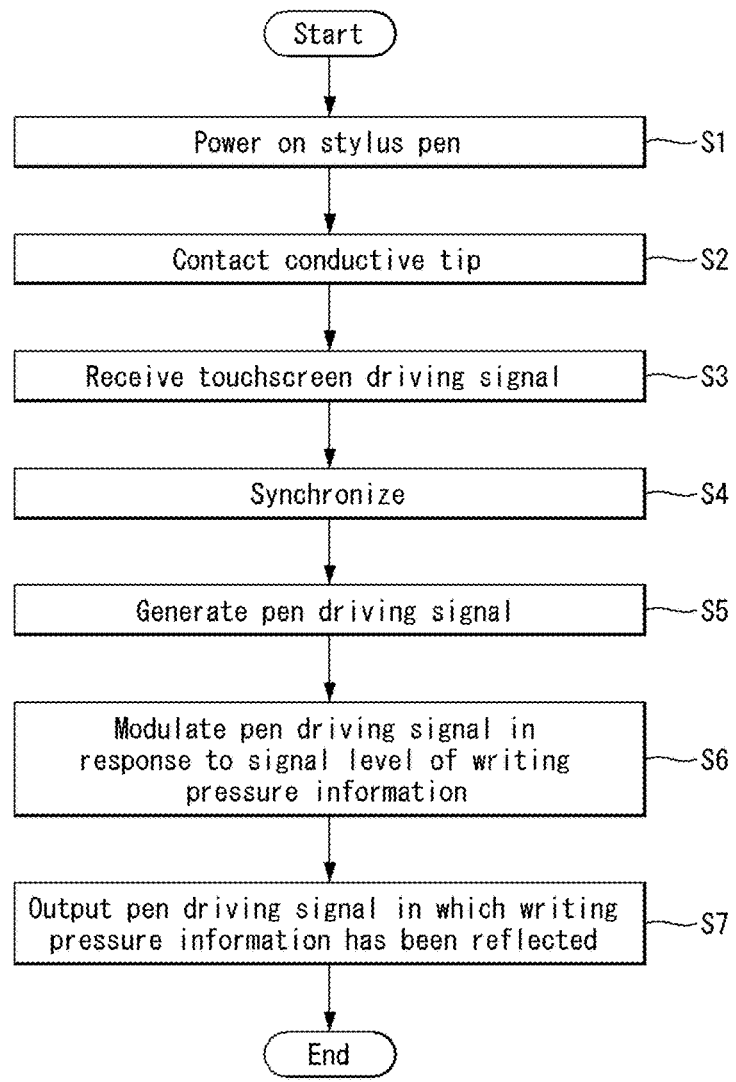
FIG. 10 is a flowchart illustrating operation of the active stylus pen according to the present invention.

FIG. 10 is a flowchart illustrating operation of the active stylus pen 20 according to the present invention.

Referring to FIG. 10, the conductive tip 210 touches a predetermined point of the touchscreen TSP while power is applied through the input/output interface 270 and the power supply 260 (S1 and S2).

The touchscreen driving signal is supplied to touch sensors of the touchscreen TSP for a touch sensor driving period. For the touch sensor driving period, the conductive tip 210 is coupled to the touchscreen TSP at the touch point to sense the touchscreen driving signal received from the touchscreen TSP and delivers the sensed signal to the receiver 230. The receiver 230 amplifies the touchscreen driving signal through the amplifier included therein, compares the amplified signal with a reference voltage through the comparator included therein and outputs the comparison result to the signal processor 250 (S3).

The signal processor 250 analyzes the comparator output signal input from the receiver 230 to determine touchscreen driving signal synchronization timing and generates a pen driving signal synchronized with the synchronization timing (S4 and S5). In addition, the signal processor 250 modulates a pulse amplitude, the number of pulses and/or a pulse duty of the pen driving signal in response to writing pressure information input from the pressure sensing unit and then outputs the pen driving signal in which the writing pressure information has been reflected to the driver 240 (S6 and S7).

The driver 240 shifts the voltage level of the pen driving signal through the level shifter and outputs the level-shifted pen driving signal to the conductive tip 210 through the switch 220. The conductive tip 210 applies the pen driving signal to the contact point of the touchscreen.

The pulse amplitude, the number of pulses and/or pulse duty of the pen driving signal are adjusted in response to the signal level of the writing pressure information. When the pulse amplitude, the number of pulses and/or pulse duty of the pen driving signal are changed, the magnitude of a sensing value (touch raw data) sensed from the touch point varies. The touch driver 18 may detect touch pressure (writing pressure) as well as the touch point by analyzing the magnitude of the touch raw data.

Figure 11:
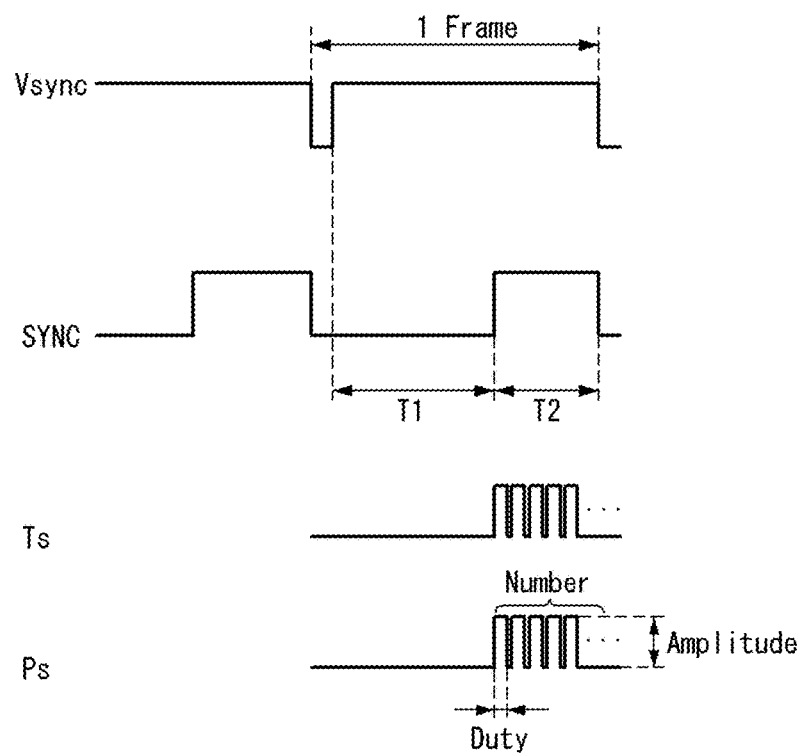
FIG. 11 illustrates synchronization of a touchscreen driving signal and a pen driving signal within a touch sensor driving period.
Figure 12:
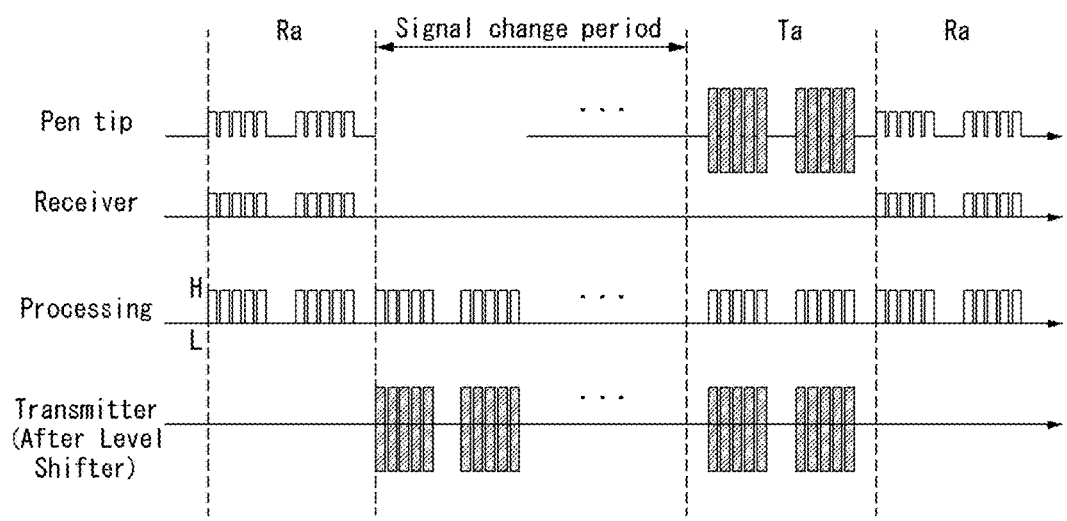
FIG. 12 illustrates waveforms of signals received and processed by the active stylus pen shown in FIG. 9.

FIG. 11 illustrates synchronization of the touchscreen driving signal and the pen driving signal within a touch sensor driving period and FIG. 12 illustrates waveforms of signals received and processed in the active stylus pen of FIG. 9.

Referring to FIGS. 11 and 12, after the active stylus pen 20 is turned on and then touches the touchscreen TSP, a signal change period corresponding to at least one frame is provided between a reception period Ra of the touchscreen driving signal Ts and a transmission period Ta of the pen driving signal Ps and thus operation stability is secured. The signal processor 250 determines timing of synchronization between the touchscreen driving signal Ts and the pen driving signal Ps using the signal change period and generates the pen driving signal Ps in which the writing pressure information is reflected according to the synchronization timing.

In the following frames, a process Ta of transmitting the pen driving signal Ps synchronized with the touchscreen driving signal Ts to the touchscreen TSP through the conductive tip 210 and a process Ra of receiving the touchscreen driving signal Ts through the conductive tip 210 are alternately repeated.

Although FIG. 12 illustrates that the touchscreen driving signal reception period Ra is equal to the pen driving signal transmission period Ta, a shorter reception period Ra may be employed, since the duration of the reception period Ra is related to a touch response speed.

Figure 13:
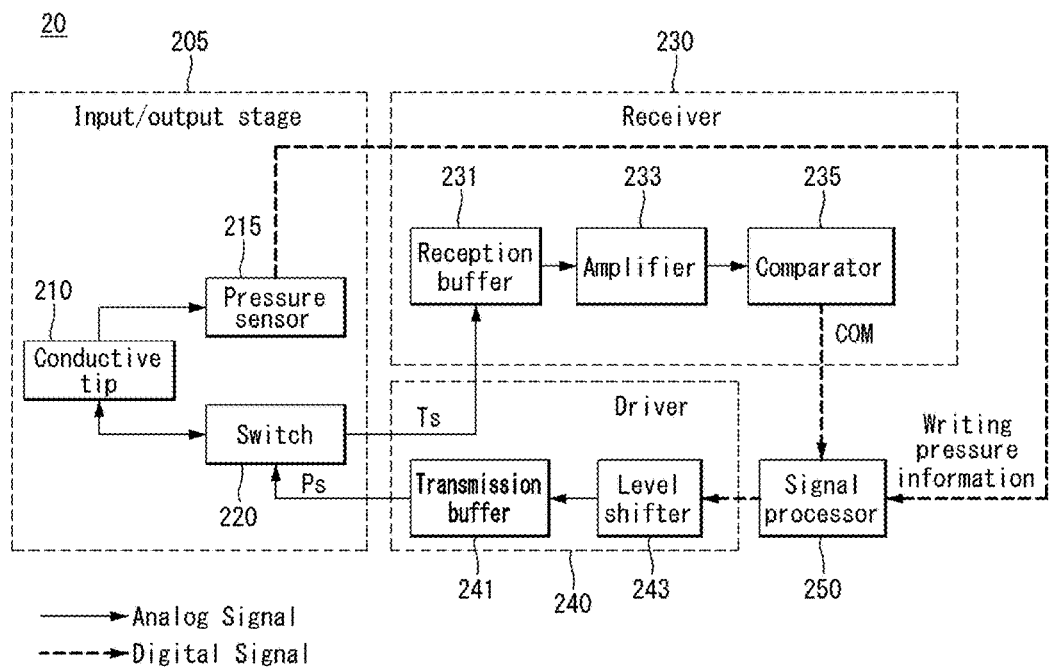
FIG. 13 illustrates the configuration of the active stylus pen illustrated in FIG. 9 in more detail.

FIG. 13 illustrates the configuration of the active stylus pen 20 illustrated in FIG. 9 in more detail.

Referring to FIG. 13, an input/output stage 205 of the active stylus pen 20 further includes a pressure sensing unit 215 in addition to the conductive tip 210 and the switch 220. The pressure sensing unit 215 senses writing pressure of the active stylus pen 20 and transmits the sensed writing pressure to the signal processor 250.

The receiver 230 of the active stylus pen 20 includes a reception buffer 231, an amplifier 233 and a comparator 235. The reception buffer 231 receives the touchscreen driving signal Ts delivered through the switch 220 and applies the touchscreen driving signal Ts to the amplifier 233. The amplifier 233 is composed of at least two stages and amplifies the analog touchscreen driving signal Ts to increase reception signal sensitivity. The comparator 235 compares signals amplified by the amplifier 233 with an internal reference voltage and generates a digital comparator output signal COM for signals higher or lower than the reference voltage. Here, the comparator 235 may use a signal higher than the reference voltage as the comparator output signal COM when the amplifier 233 is configured as an inverted amplifier and use a signal lower than the reference voltage as the comparator output signal COM when the amplifier 233 is configured as a non-inverted amplifier.

The signal processor 250 of the active stylus pen 20 determines timing of synchronizing with the touchscreen driving signal Ts on the basis of the comparator output signal COM, as described above, and then generates the digital pen driving signal on the basis of the synchronization timing. In addition, the signal processor 250 modulates the pen driving signal on the basis of the writing pressure information input from the pressure sensing unit 215 to output the pen driving signal Ps in which the writing pressure information has been reflected. Writing pressure information may be transmitted from a stylus pen to a touch module using an additional communication module included in the stylus pen, and the touch module may sense pressure using an additional logic block. In one or more embodiments, the additional communication block and logic block for pressure sensing may be omitted for simplicity. The present invention encodes the writing pressure information in the pen driving signal Ps in such a manner that the pulse amplitude, the number of pulses and/or pulse duty of the pen driving signal Ps are adjusted based on the signal level of the writing pressure information, senses a magnitude variation of touch raw data according to the pen driving signal Ps and decodes touch pressure as well as a touch point on the basis of the sensed magnitude variation of the touch raw data.

The driver 240 of the active stylus pen 20 includes a level shifter 243 and a transmission buffer 241, converts the digital pen driving signal Ps input from the signal processor 250 into an analog signal and outputs the analog signal to the switch 220. Then, the switch 220 delivers the pen driving signal Ps to the conductive tip 210.

Figure 14:
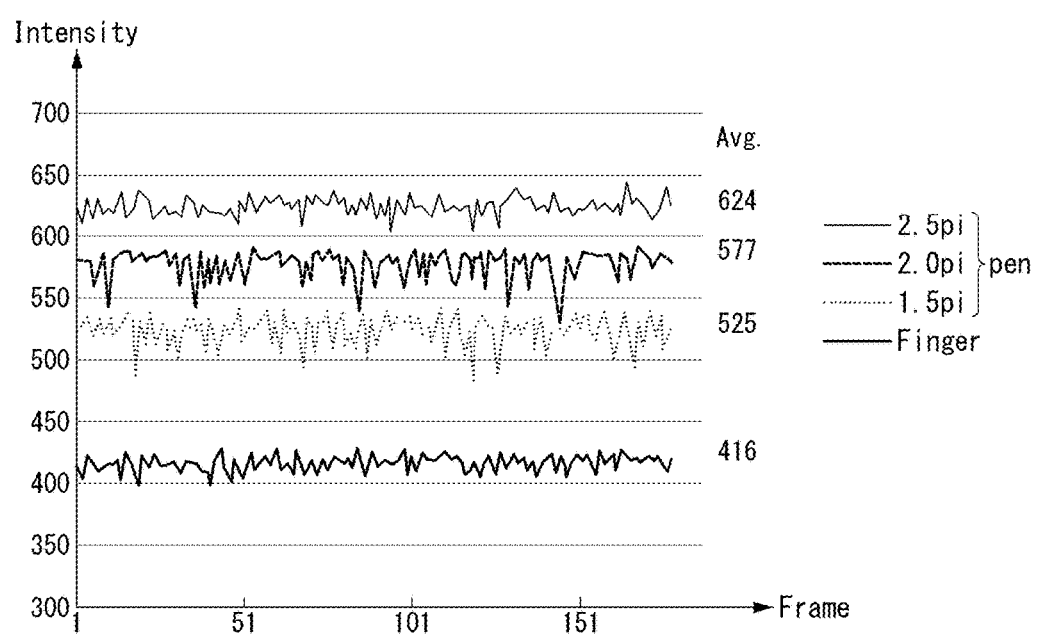
FIG. 14 illustrates enhancement of sensitivity of a touch sensing signal during stylus pen touch compared to finger touch.

FIG. 14 illustrates a simulation result showing improvement of touch sensing signal sensitivity during active stylus pen touch, compared to finger touch.

Referring to FIG. 14, touch sensing signal intensities are measured when the active stylus pen touches the touchscreen and when a finger touches the touchscreen. As shown in FIG. 14, the sensing signal intensity when the stylus pen touches the touchscreen is higher than the sensing signal intensity when the finger touches the touchscreen, and the sensing signal (touch raw data) intensity increases as capacitance coupled between the touchscreen and the conductive tip increases (i.e., as the pulse amplitude, the number of pulses and/or the pulse duty of the pen driving signal Ps increases).

[Writing Pressure Sensing Method]

Figure 15:
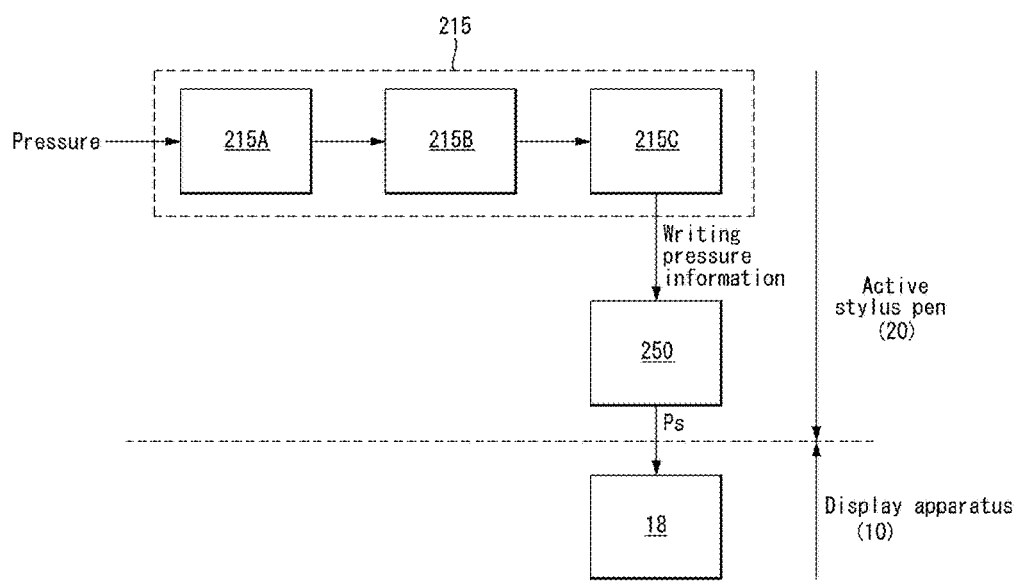
FIG. 15 illustrates a pressure sensing unit of FIG. 13 in more detail.
Figure 16:
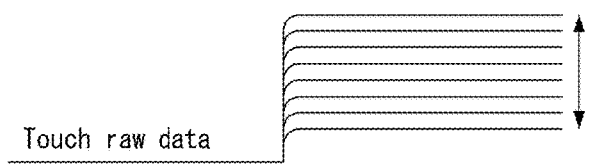
FIG. 16 illustrates touch raw data variation according to a touch pressure (writing pressure) variation.
Figure 17:
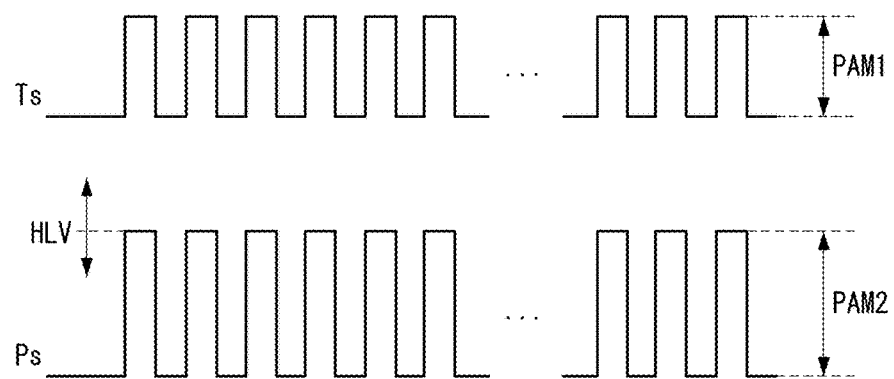
FIG. 17 illustrates an example of modulating the amplitude of a pen driving signal in response to a signal level of writing pressure information.
Figure 18:
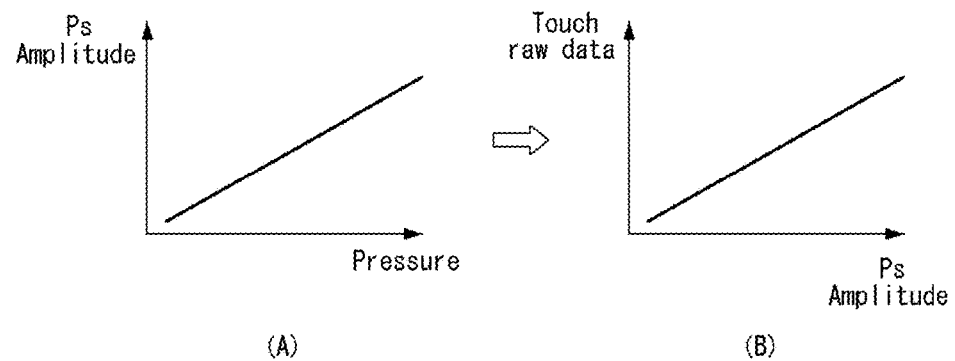
FIG. 18 illustrates a relationship among touch pressure, a pen driving signal amplitude and touch raw data.
Figure 19:
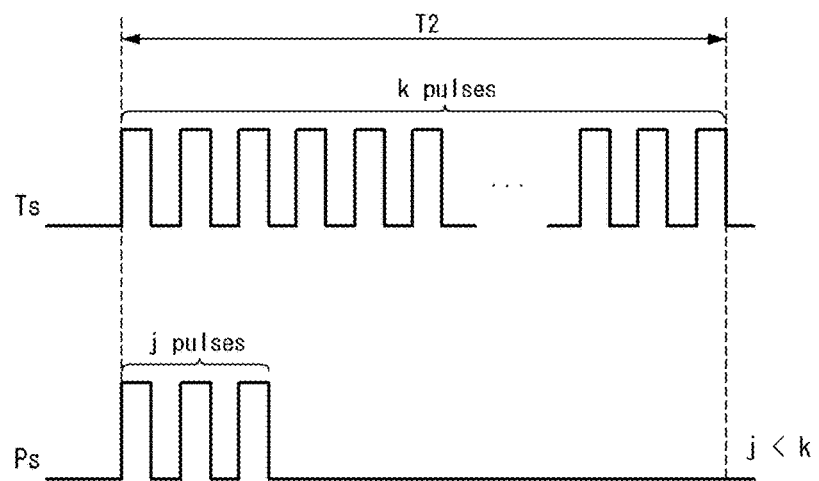
FIG. 19 illustrates an example of modulating the number of pulses of the pen driving signal in response to the signal level of writing pressure information.
Figure 20:
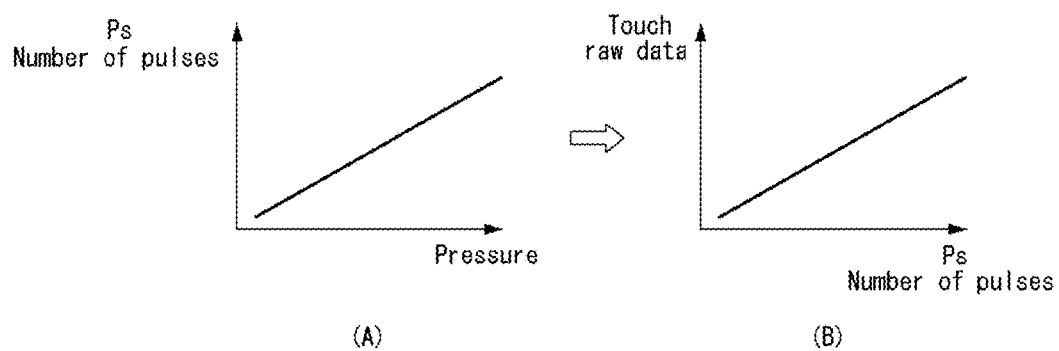
FIG. 20 illustrates a relationship among touch pressure, the number of pulses of the pen driving signal and touch raw data.
Figure 21:
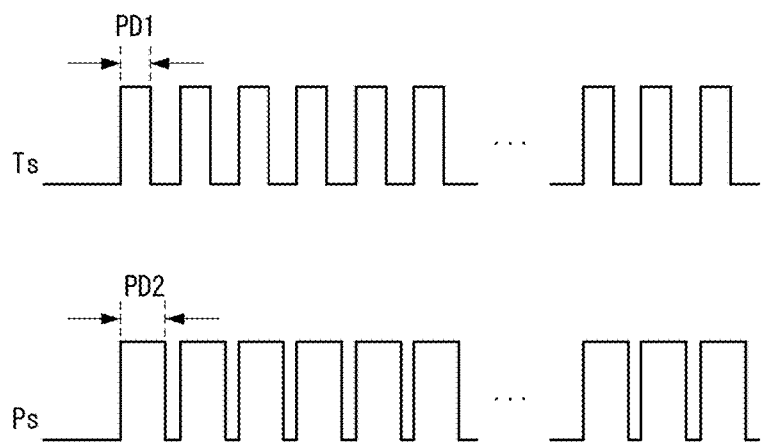
FIG. 21 illustrates an example of modulating a pulse duty of the pen driving signal in response to the signal level of writing pressure information.
Figure 22:
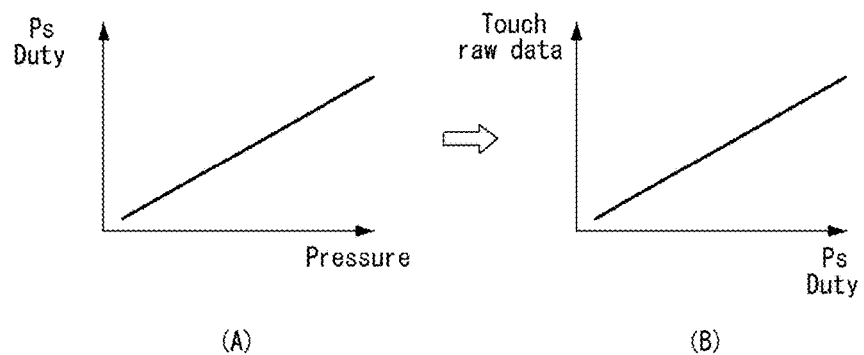
FIG. 22 illustrates a relationship among touch pressure, the pulse duty of the pen driving signal and the touch raw data.

FIG. 15 illustrates the pressure sensing unit 215 of FIG. 13 in more detail and FIG. 16 illustrates a touch raw data variation according to touch pressure (writing pressure) variation. FIG. 17 illustrates an example of modulating the amplitude of a pen driving signal in response to a signal level of writing pressure information in order to generate the pen driving signal and FIG. 18 illustrates a relationship among touch pressure, a pen driving signal amplitude and touch raw data. FIG. 19 illustrates an example of modulating the number of pulses of the pen driving signal in response to the signal level of writing pressure information and FIG. 20 illustrates a relationship among touch pressure, the number of pulses of the pen driving signal and touch raw data. FIG. 21 illustrates an example of modulating a pulse duty of the pen driving signal in response to the signal level of the writing pressure information and FIG. 22 illustrates a relationship among touch pressure, the pulse duty of the pen driving signal and the touch raw data.

The pressure sensing unit 215 may include a variable resistance unit 215A, a voltage converter 215B and an ADC 215C. The variable resistance unit 215A has a resistance that varies with pressure change. The voltage converter 215B generates an output voltage corresponding to the resistance of the variable resistance unit 215A. The ADC 215C converts a voltage corresponding to the pressure into a digital signal and outputs the digital signal as writing pressure information to the signal processor 250. The variable resistance unit 215A may be replaced by a variable capacitor. In this case, the voltage converter 215B may be replaced by an RC delay element. Furthermore, the ADC 215C may be replaced by a comparator.

The signal processor 250 may modulate the pulse amplitude of the pen driving signal synchronized with the touchscreen driving signal Ts in response to the signal level of the writing pressure information to generate the pen driving signal Ps in which the writing information has been reflected, as illustrated in FIG. 17. Here, the signal processor 250 may represent the writing pressure by varying the pulse amplitude of the pen driving signal Ps within a range within which touch input can be sensed. In other words, the pulse amplitude PAM2 of the pen driving signal Ps may be identical to a pulse amplitude PAM1 of the touchscreen driving signal Ts when the writing pressure information is not input and may increase in proportion to the signal level of the writing pressure information, compared to the pulse amplitude PAM1 of the touchscreen driving signal Ts, as illustrated in FIG. 18 part (A). As the pulse amplitude PAM2 of the pen driving signal Ps increases, the magnitude of a touch sensing signal (touch raw data) sensed from the touchscreen may increase, and the touch driver may determine touch pressure (writing pressure) through comparison of the touch raw data, as illustrated in FIG. 18 part (B). In other words, the touch driver may determine that writing pressure increases as the magnitude of the touch raw data increases, as illustrated in FIG. 16.

To adjust the pulse amplitude PAM2 of the pen driving signal Ps, the signal processor 250 can modulate a high-level voltage HLV of the pen driving signal Ps in response to the signal level of the writing pressure information.

The signal processor 250 may generate the pen driving signal Ps in which the writing pressure information has been reflected by modulating the number of pulses of the pen driving signal, which is synchronized with the touchscreen driving signal Ts and output for one touch sensor driving period T2, in response to the signal level of the writing pressure information, as illustrated in FIG. 19. Here, the signal processor 250 may vary the number of pulses of the pen driving signal Ps within a range within which touch input can be sensed to represent the writing pressure information. The number j of pulses of the pen driving signal Ps may gradually increase in proportion to the signal level of the writing pressure information within the number k of pulses of the touchscreen driving signal Ts for one touch sensor driving period T2, as illustrated in FIG. 20 part (A). As the number of pulses of the pen driving signal Ps increases, the magnitude of the touch sensing signal (touch raw data) sensed from the touchscreen may increase, and the touch driver may determine touch pressure (writing pressure) through comparison of touch raw data, as illustrated in FIG. 20 part (B). In other words, the touch driver can determine that writing pressure increases as the magnitude of touch raw data increases, as illustrated in FIG. 16.

The signal processor 250 may generate the pen driving signal Ps in which writing pressure information has been reflected by modulating the pulse duty of the pen driving signal synchronized with the touchscreen driving signal Ts in response to the signal level of the writing pressure information, as illustrated in FIG. 21. Here, the signal processor 250 may vary the pulse duty of the pen driving signal Ps within a range within which touch input can be sensed to represent the writing pressure information.

In other words, the pulse duty PD2 of the pen driving signal Ps may be identical to the pulse duty PD1 of the touchscreen driving signal Ts when writing pressure information is not input and may increase in proportion to the signal level of the writing pressure information, compared to the pulse duty PD1 of the touchscreen driving signal Ts, as illustrated in FIG. 22 part (A). As the pulse duty PD2 of the pen driving signal Ps increases, the magnitude of the touch sensing signal (touch raw data) sensed from the touchscreen may increase and the touch driver may determine touch pressure (writing pressure) through comparison of touch raw data, as illustrated in FIG. 22 part (B). In other words, the touch driver can determine that the writing pressure increases as the magnitude of the touch raw data increases, as illustrated in FIG. 16.

The signal processor 250 may generate the pen driving signal Ps in which the writing pressure information has been reflected by modulating two or more of the pulse amplitude, the number of pulses and pulse duty of the pen driving signal synchronized with the touchscreen driving signal Ts in response to the signal level of the writing pressure information.

Figure 23:
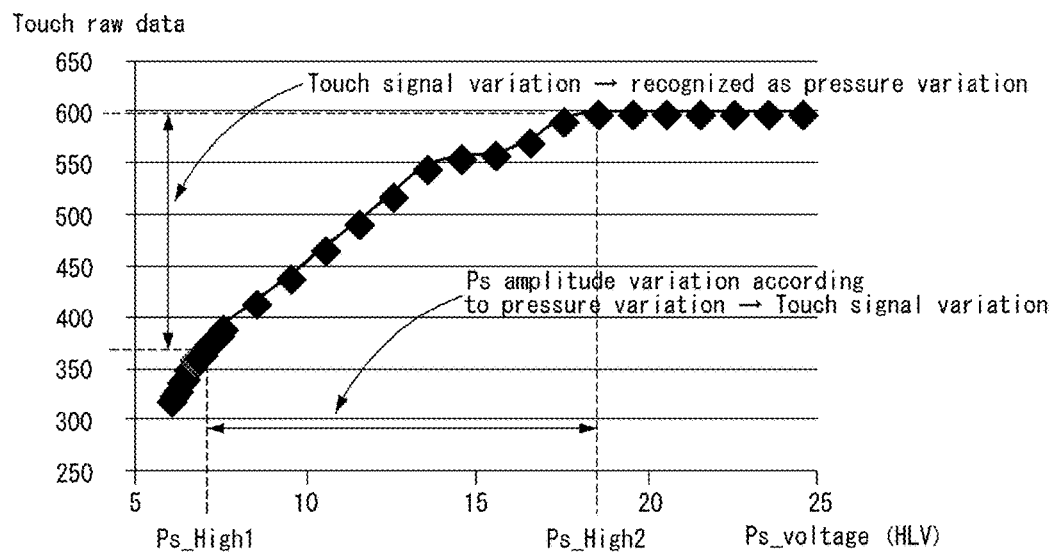
FIG. 23 illustrates a simulation result indicating a touch raw data variation according to a pen driving signal voltage variation.

FIG. 23 illustrates a simulation result indicating touch raw data variation in response to high-level voltage variation of the pen driving signal Ps.

As can be seen from the experimental result of FIG. 23, the magnitude of touch raw data increases from 360 to 600 approximately when the high-level voltage HLV of the pen driving signal Ps is changed from Ps_High1 to Ps_High2 in response to writing pressure variation. In addition, when the number of pulses and/or the pulse duty of the pen driving signal Ps are varied in response to a writing pressure variation, the magnitude of touch raw data changes in proportion to the number of pulses and/or the pulse duty of the pen driving signal Ps. The touch driver can sense a pressure level on the basis of the touch raw data variation.

Figure 24:
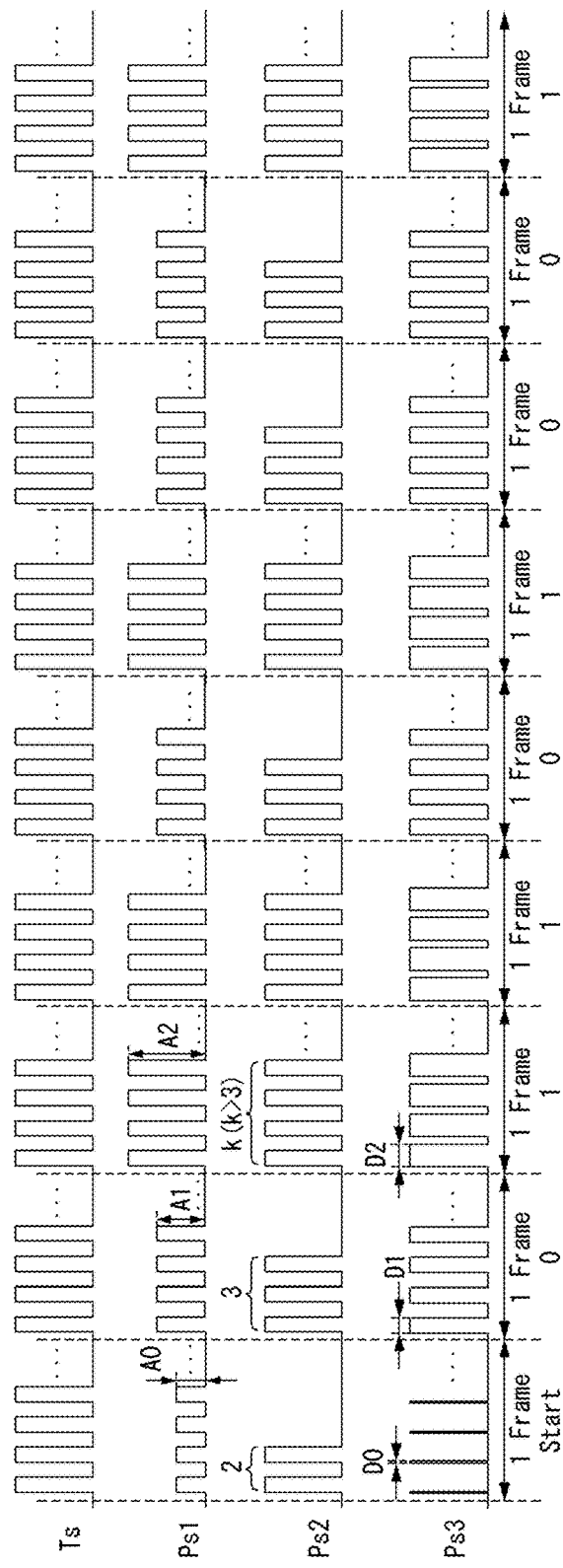
FIG. 24 illustrates an example of modulating the pen driving signal in units of one frame in response to the signal level of the writing pressure information.
Figure 25A:
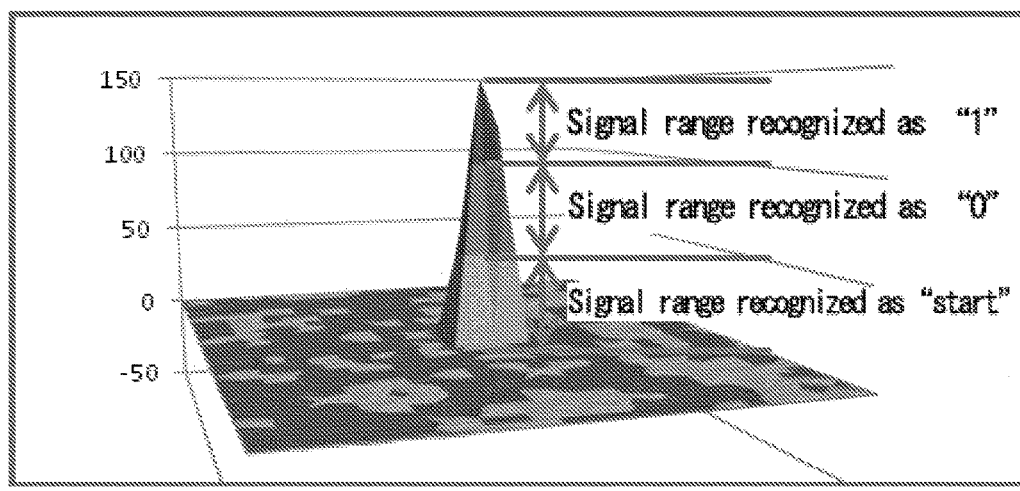
FIGS. 25A, 25B, and 25C illustrate examples of touchscreen sensing value (touch raw data) variation according to writing pressure information applied to the pen driving signal.
Figure 25B:
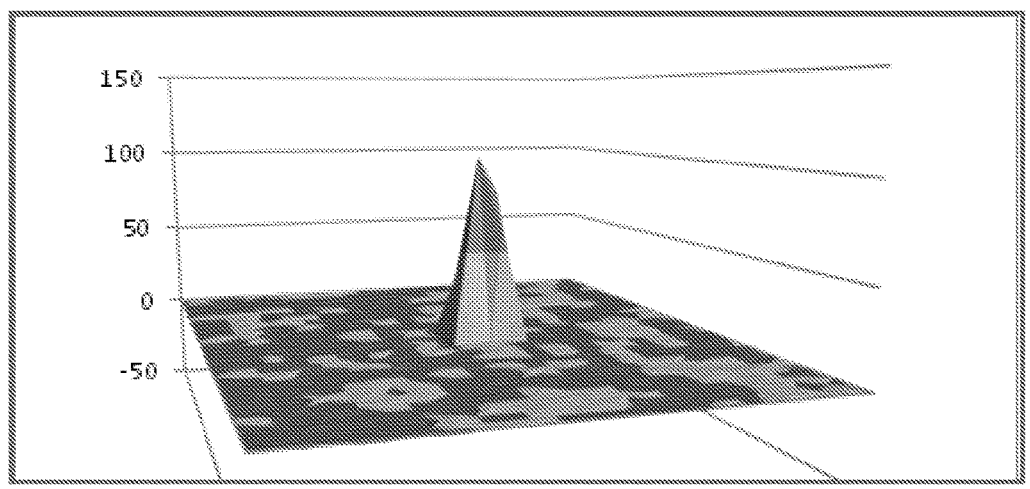
Figure 25C:
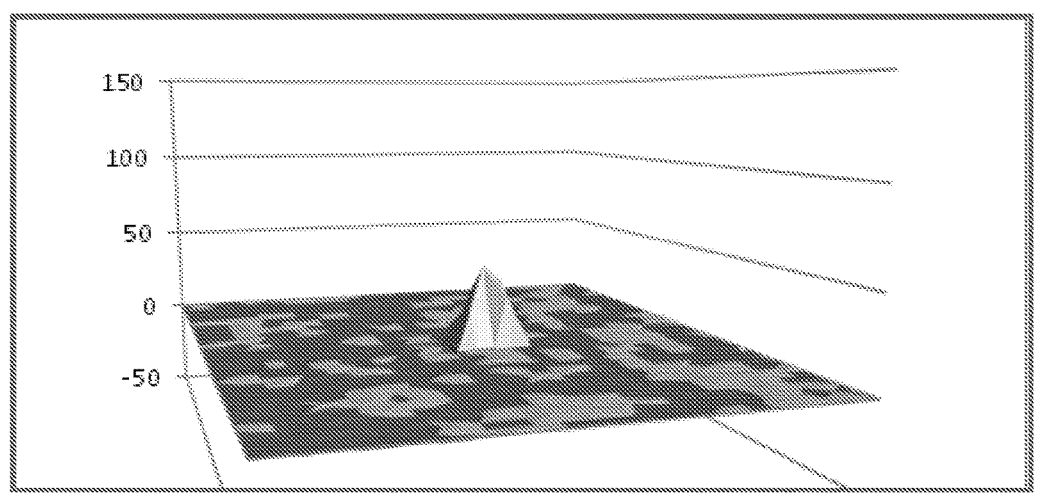
Figure 26:
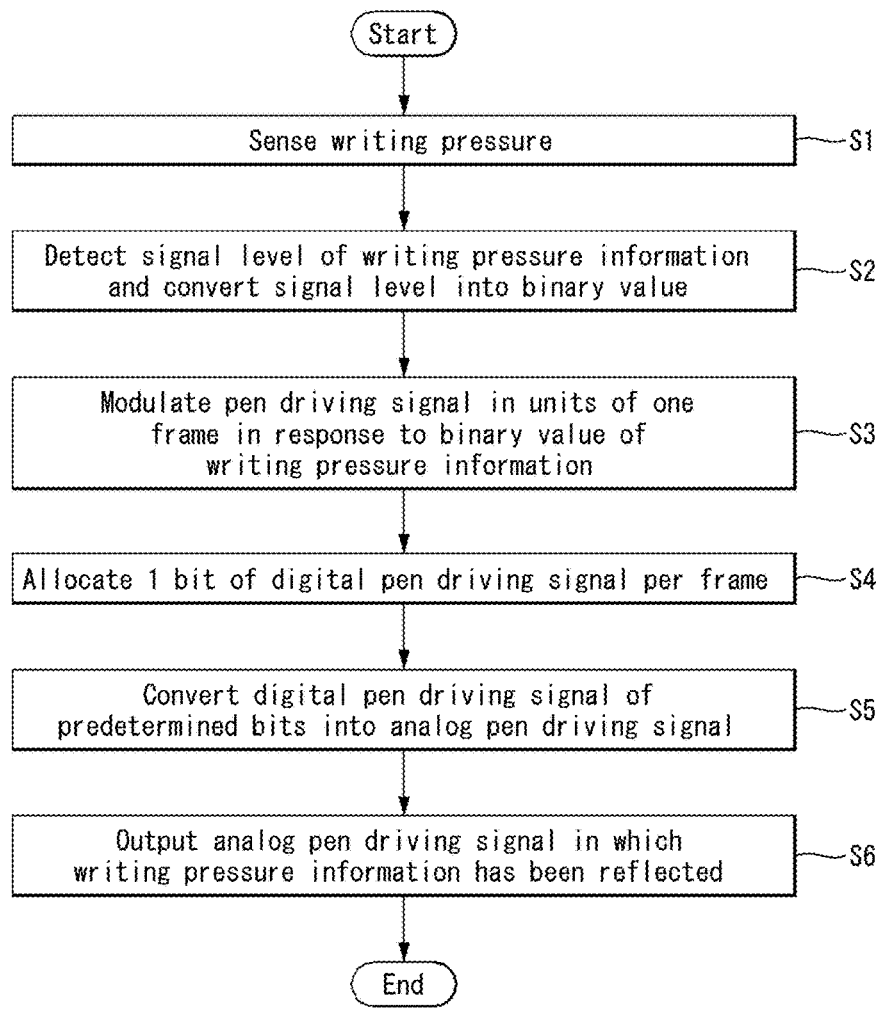
FIG. 26 is a flowchart illustrating a process of applying writing pressure information to the pen driving signal and outputting the pen driving signal.

FIG. 24 illustrates an example of modulating the pen driving signal Ps in units of one frame in response to the signal level of writing pressure information. FIGS. 25A to 25C illustrate examples of touchscreen sensing value (touch raw data) variation in response to writing pressure information reflected in the pen driving signal Ps. FIG. 26 illustrates a process of reflecting writing pressure information in the pen driving signal and outputting the pen driving signal in the signal processor 250.

Referring to FIGS. 24 to 26, the pressure sensing unit 215 senses writing pressure and converts the sensed writing pressure into a binary value to generate digital writing pressure information (S1 and S2). The signal processor 250 modulates the pen driving signal Ps in units of one frame in response to the signal level of the writing pressure information and allocates 1 bit of the digital pen driving signal Ps in which writing pressure information has been reflected per frame to generate the pen driving signal Ps of predetermined bits (S3 and S4). For example, the signal processor 250 can indicate digital information "0" and "1" by varying the pulse amplitude of the pen driving signal Ps1 to different levels A1 and A2, by varying the number of pulses of the pen driving signal Ps2 to different values 3 and k or by varying the pulse duty of the pen driving signal Ps3 to different values D1 and D2, as illustrated in FIG. 24. To represent the signal level of writing pressure information, the logic value of the pen driving signal Ps may be controlled per frame. In this case, 256 pressure levels may be represented by an 8-bit pen driving signal Ps implemented using 8 frames. Such a digital pen driving signal Ps of a predetermined bit is amplified to an analog level through the driver 240 and output to the touchscreen (S5 and S6). A touch sensing value (touch raw data) according to a pen driving signal Ps represented by a logic value "1" is greater than a touch sensing value according to a pen driving signal Ps represented by a logic value "0", as illustrated in FIGS. 25A and 25B. The touch driver 18 of the display apparatus 10 may sense 8-bit writing pressure information on the basis of a touch sensing value according to the pen driving signal Ps and determine writing pressure of the pen according to the writing pressure.

To load m-bit writing pressure information in the pen driving signal Ps, m frames may be implemented, as described above. The signal processor 250 may allocate a start frame for every m frames, as illustrated in FIG. 24, to define m-bit writing pressure information. The start frame is allocated a pen driving signal for start to define writing pressure information. The pen driving signal for start is used as a flag signal and has a pulse amplitude, the number of pulses and/or a pulse duty different from those of the pen driving signal Ps represented by "1" or "0". Specifically, the pulse amplitude of the pen driving signal for start is less than that of the pen driving signal Ps represented by "0", the number of pulses of the pen driving signal for start is less than that of the pen driving signal Ps represented by "0" and the pulse duty of the pen driving signal for start is less than that of the pen driving signal Ps represented by "0". When writing pressure information is defined as predetermined bits using the start frame, the writing pressure information can be correctly delivered to the touch driver 18 even if the touchscreen has a large load.

As described above, the present invention reflects writing pressure information in a pen driving signal by adjusting the pulse amplitude, the number of pulses and/or pulse duty of the pen driving signal in response to the signal level of writing pressure information, senses a variation in the magnitude of touch raw data according to the pen driving signal in which the writing pressure information has been reflected, and then detects touch pressure as well as a touch point on the basis of the variation in the magnitude of the touch raw data. Accordingly, an additional communication block and logic block for pressure sensing can be omitted, and thus can reduce manufacturing costs.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system comprising:
    a touchscreen including a plurality of touch electrodes and a plurality of sensor lines connected to the plurality of touch electrodes;
    a touch driver for applying a touchscreen driving signal to the touchscreen and sensing a capacitance variation in the touchscreen, the touch driver including:
        a touch sensor channel part connected to the plurality of touch electrodes through the plurality of sensor lines;
        a common voltage buffer that outputs a common voltage;
        a multiplexor;
        a switch array connected to the touch sensor channel part, the common voltage buffer, and the multiplexor, the switch array switching between connecting the touch sensor channel part to the common voltage buffer during a display driving period for display an image and connecting the touch sensor channel part to the multiplexor during a touch sensing period for sensing a touch of the touch screen;
        a sensing unit that amplifies charges received from the plurality of touch electrodes, integrates the amplified charges into a voltage, and converts the voltage to digital data responsive to the multiplexor and the switch array connecting the touch sensor channel part to the sensing unit during the touch sensing period;
        a first timing control signal generator that generates a touch enable signal having a first level and a second level that is distinct from the first level, the first level indicative of the display driving period, and the second level indicative of the touch sensing period;
        a second timing control signal generator configured to generate one or more timing signals and a clock signal to control timing operation of the multiplexor and the sensing unit;
        a DTX compensator configured to remove noise from the digital data;
        a first memory connected to the DTX compensator, the first memory storing the digital data with the noise removed from the digital data based on at least one of the timing signals generated by the second timing control signal generator; and
        a microcontroller unit configured to receive the digital data stored by the first memory and compare the digital data with a threshold value, the comparison indicative of whether the touchscreen was touched; and
    an active stylus pen for generating a pen driving signal and transmitting the pen driving signal to the touchscreen,
    wherein the active stylus pen comprises:
        a pressure sensing unit for sensing pressure when the touchscreen is touched to generate writing pressure information, the pressure sensing unit including:
            a variable resistance unit having a resistance that varies based on changes in the sensed pressure;
            a voltage converter coupled to the variable resistance unit, the voltage converter generating an output voltage that varies based on the varying resistance of the variable resistance unit, and
            an analog-to-digital converter (ADC) that converts the output voltage into a digital signal that is representative of the writing pressure information;
        a signal processor for generating the pen driving signal synchronized with the touchscreen driving signal received from the touchscreen and varying the pen driving signal in response to a signal level of the digital signal that is representative of the writing pressure information.

2. The touch sensing system of claim 1, wherein the signal processor modulates a pulse amplitude of the pen driving signal in response to the signal level of the digital signal that is representative of the writing pressure information.

3. The touch sensing system of claim 1, wherein the signal processor modulates a number of pulses of the pen driving signal generated for one touch sensor driving period in response to the signal level of the digital signal that is representative of the writing pressure information.

4. The touch sensing system of claim 1, wherein the signal processor modulates a pulse duty of the pen driving signal in response to the signal level of the digital signal that is representative of the writing pressure information.

5. The touch sensing system of claim 1, wherein the signal processor modulates the pen driving signal in each frame in response to the signal level of the digital signal that is representative of the writing pressure information, and wherein a digital pen driving signal in which the writing pressure information has been reflected is allocated to each frame by one bit.

6. The touch sensing system of claim 5, wherein the signal processor modulates a pulse amplitude, a number of pulses and a pulse duty of the pen driving signal within a range.

7. The touch sensing system of claim 1, wherein the touch sensor channel part, the common voltage buffer, the multiplexor, the switch array, the sensing unit, the first timing control signal generator, the second timing control signal generator, the DTX compensator, and the first memory are integrated into a driver integrated circuit of the touch driver, and wherein the microcontroller unit is a separate integrated circuit from the driver integrated circuit.

8. The touch sensing system of claim 1, wherein the touch sensor channel part, the common voltage buffer, the multiplexor, the switch array, the sensing unit, the first timing control signal generator, the second timing control signal generator, the DTX compensator, the first memory, and the microcontroller unit are integrated into a driver integrated circuit of the touch driver.

9. The touch sensing system of claim 8, wherein the touch driver further comprises:

a second memory that is external to the driver integrated circuit, the second memory storing register values associated with timing information, wherein the register values are loaded into the first timing signal control generator and the second timing control signal generator to generate the touch enable signal, the one or more timing signals, and the clock signal.

* * * * *